United States Patent
Schweitzer et al.

[15] 3,684,275
[45] Aug. 15, 1972

[54] DEVICE FOR ZIG-ZAG FOLDING AN OSCILLOGRAPHIC RECORD CHART

[72] Inventors: Earl O. Schweitzer, Wickliffe; Ronald J. Geil, Strongsville, both of Ohio

[73] Assignee: Clevite Corporation

[22] Filed: March 9, 1970

[21] Appl. No.: 17,522

[52] U.S. Cl. .................................................. 270/79
[51] Int. Cl. ............................................... B65h 45/20
[58] Field of Search ......... 270/79, 52, 52.5, 61 F, 32; 83/358

[56] References Cited

UNITED STATES PATENTS

| | | |
|---|---|---|
| 2,854,233 | 9/1958 | Groeper ..................... 270/79 |
| 2,947,536 | 8/1960 | Martin ........................ 270/79 |
| 3,484,098 | 12/1969 | Ramsey et al. ............. 270/83 |
| 1,805,181 | 5/1931 | Brenn ...................... 270/61 R |
| 1,875,655 | 12/1932 | Rawson ...................... 270/79 |
| 3,086,768 | 4/1963 | Lach .......................... 270/79 |
| 3,361,021 | 1/1968 | Toth ....................... 270/61 R |

*Primary Examiner*—Robert W. Michell
*Attorney*—Eber J. Hyde

[57] ABSTRACT

An oscillographic record chart zig-zag folding device is disclosed, wherein the record chart is pre-cut or scored at regular intervals. A mechanism alternately front-folds and back-folds the chart at the pre-scored locations and a photo-cell device senses timing marks on the chart and synchronizes the folding actions. The chart can be driven at any of a number of different speeds.

4 Claims, 14 Drawing Figures

PATENTED AUG 15 1972 3,684,275

INVENTORS
EARL O. SCHWEITZER
RONALD J. GEIL
BY

*Eber J. Hyde*
ATTORNEY

INVENTORS
EARL O. SCHWEITZER
RONALD J. GEIL
BY
ATTORNEY

INVENTORS
EARL O. SCHWEITZER
RONALD J. GEIL

BY

ATTORNEY

DEVICE FOR ZIG-ZAG FOLDING AN OSCILLOGRAPHIC RECORD CHART

BACKGROUND OF THE INVENTION

Oscillographic recorders using paper record charts utilize many types of recording means such as ink, heat, chemical writing, pressure writing etc., and in recent years have progressed in writing speed to the point where the chart can be driven from a slow, constant speed to a very rapid constant rate with satisfactory records being obtained. In the past the chart was unrolled, written upon, and re-rolled, which prevented the operator from seeing much of the record immediately after it was written. Also, it was difficult and cumbersome to unroll the finished record to inspect or copy particular parts of the record. Fan-folding the record at the output of the recorder solves many of the problems, but it introduces some of its own. At the fold location, the output pile tends to be thicker than between the fold locations, causing the output pile to tend to slide as it builds up.

SUMMARY OF THE INVENTION

It has been found that a solution to the problems lies in carefully pre-scoring the back surface of the record chart only part way through the chart, then after the record has been made, the chart alternately can be front-folded and back-folded into a zig-zag or fan-fold condition by a mechanism which carefully, yet forcibly, crushes the chart at the pre-scored lines. Synchronizing means operating from timing marks associated with the record chart control the operation to assure that the folds occur only at pre-scored lines, and the folding device is operative at any of the selectable chart speeds.

For a detailed description of the pre-scored record medium reference may be made to application, Ser. No. 887,508 filed on Dec. 23, 1969, in the name of Milton Gross, and assigned to the assignee of this invention.

It is an object of the present invention to provide a zig-zag or fan-fold system and device for folding the output chart paper of an oscillographic recorder into a neat, uniform pile; the device being operative at any of a number of selectable chart speeds.

For a better understanding of the present invention, together with other and further objects thereof, reference is had to the following description taken in connection with the accompanying drawings, and its scope will be pointed out in the appended claims.

With reference to the drawings there is shown in

FIG. 1 a generalized view of the system;

Figure 8:
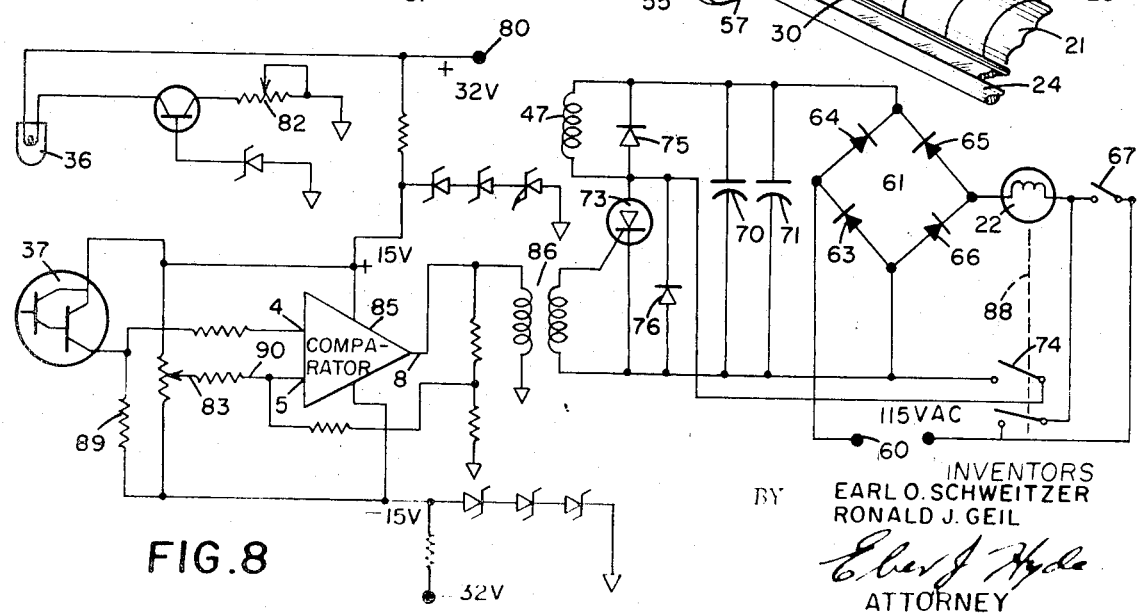

FIGS. 6a, 6b, 6c, and 6d show steps in the sequence of a front-fold operation;

FIGS. 7a, 7b, 7c, and 7d show similar steps in the sequence of a back-fold operation; and FIG. 8 is a circuit for actuating and timing the system and mechanism.

Figure 1:
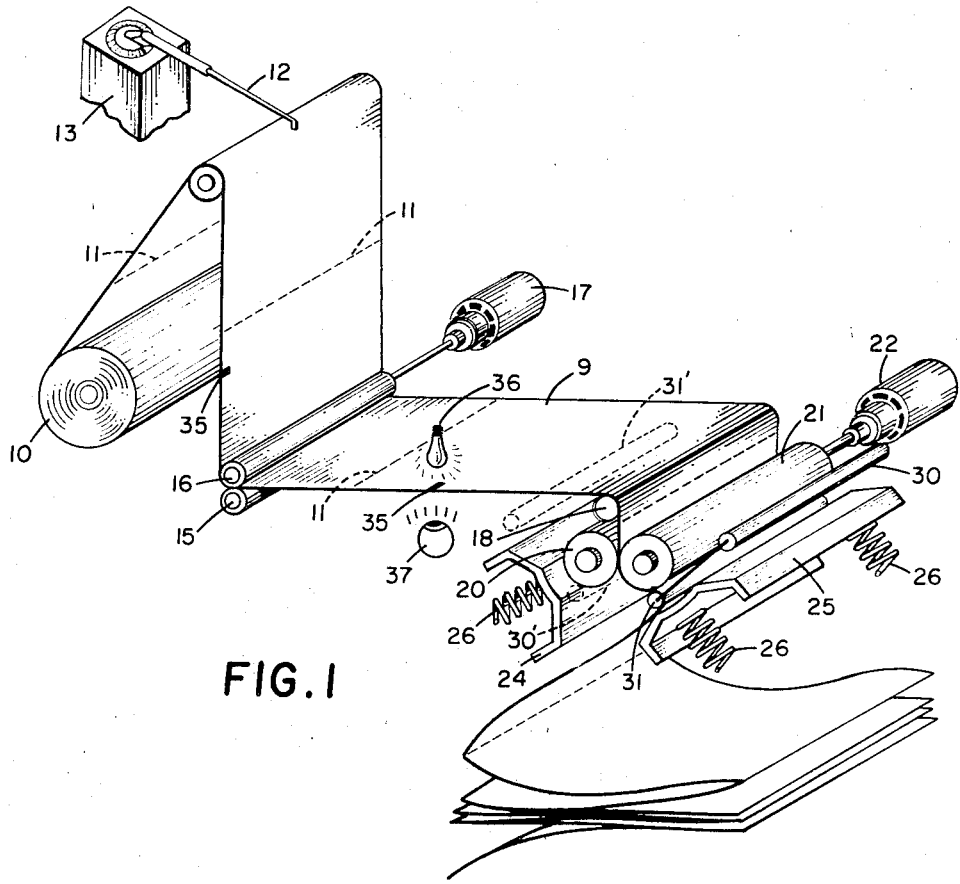

With reference to FIG. 1 there is shown, in stylized form, the general system which includes a supply roll 10 of chart paper 9 having partially pre-cut or partially pre-perforated transverse lines 11 in accordance with the aforedescribed gross patent application. The pre-cut or pre-perforated marks preferably extend only part way through the chart paper 9, so that the record surface remains smooth and imperforate in order that the action of the pen 12 of the pen recorder mechanism 13 can move across the surface thereof undisturbed by any cut line, holes, or by any raised line. The chart paper 9 is drawn between two drive rollers 15 and 16, one of which is driven at a selected constant rate of speed by motor 17, in order that the chart at the location of the pen 12 will move at the selected constant rate of speed.

After the oscillographic record chart 9 leaves the recorder, the paper passes over bar 18 and down between drive rolls 20, 21, one of which is driven by motor 22, which may be of the torque drive type or it may be coupled to the roll 21 by a slip belt or clutch arrangement which will permit the rolls 20, 21 to be quickly stopped periodically during creasing operations without the motor 22 stopping. Stopping the rolls 21, 22 serves as a paper stopping means and prevents any paper 9 from being pulled between the rolls 20, 21 during a folding and creasing operation which then quickly takes place at the underneath or output side of the rolls 20, 21. Meanwhile, while rolls 20, 21 are stopped for a very short interval of time, motor 17 continues to advance the chart 9 at its selected uniform rate of advance.

At the output side of the rolls 20, 21 are two clamps or paper folders 24, 25, one of which (24) cooperates with roll 20 to fold paper positioned therebetween and the other of which (25) cooperates with roll 21 to fold paper positioned between them. Each clamp is spring biased toward its respective roll by springs 26. The clamps 24, 25 are mounted on the frame of the device, not shown in FIG. 1, and an oscillating carriage bar device 30, 31 is also mounted to the frame. In FIG. 1 the solid line carriage bar 30–31 is shown between roll 21 and clamp 25 where it has carried paper 9 into position to be creased after the lower bar 31 is moved out of the way. After the clamp 25 is caused to crease the paper 9 against the roll 21 it is moved away from the roll by mechanism more fully described later, rolls 20, 21 are caused to rotate and the folded "sheet" falls onto a zig-zag or fan-fold pile. The dotted-line position 30'–31' shows the carriage bar 31' in its other extreme position where bar 30' would carry paper 9 between roll 20 and clamp 24. Here the paper movement is again stopped, the back fold made, and the paper again advanced.

In order to synchronize the stop action of the rolls 20, 21 with the passage of the partially cut lines 11 in the paper chart 9 and with the action of the clamps 24 and 25 to fold first to one side and then to the other, timing marks 35 are printed on the record chart 9 in a fixed relation to the cut lines 11. As shown there is a timing mark 35 just ahead of each cut line 11. The mark preferably is a dark area which passes between a light source 36 and a photo-cell 37 located on the other side of the chart. The photo-cell 37 is sufficiently sensitive that the output of the cell can control a circuit which appropriately times the action of the mechanism. Details of the circuit are described in relation to FIG. 8.

Figure 2:
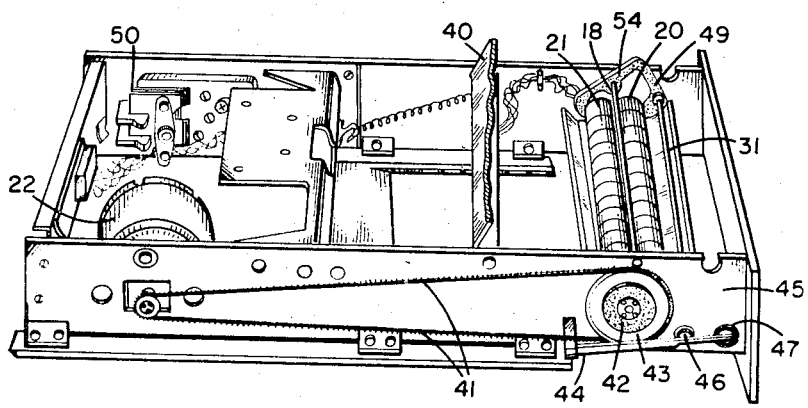
FIG. 2 is a view from one side of the chart drive, looking down into the device, with the cover removed.

With reference to FIG. 2 the folding device is shown upside-down with a cover 40 broken away to reveal the mechanism. Motor 22 is connected through a drive belt 41 to a drive wheel 42 to drive roll 21. The wheel 42 has a flange portion 43 adapted to engage a brake arm 44 which is pivoted to the frame 45 at point 46 and is actuated by solenoid 47 to substantially instantly stop the rotation of wheel 42 and flange 43 while torque motor 22 continues to run, a slip clutch, not shown, being provided between motor 22 and belt 41 to decouple the motor inertia from the brake, thereby to cause quicker stopping of the paper 9. Drive rolls 20 and 21 are rotatably mounted in frame 45, and the bar 18 is pivotally mounted in the frame 45 and carries at each of its ends a frame 49 which rocks or oscillates under driving forces derived from motor 50 (FIG. 3) through crank arms 51 and 52 and a shaft (not shown) which extends through slot 53 and is connected to the bottom edge of the frame 49 away from its upper, or pivot edge 54. The frame 49 is open and the ends of the rolls 20, 21 extend through it in order to mount in the frame 45, as shown in FIG. 5. As shown right side up in FIG. 5 and upside down in FIG. 4, the two carriage bars 30, and 31 are carried by the frames 49 to cause the carriage bars to oscillate between the solid line and dotted line positions shown in FIG. 1 as the frames 49 are driven by motor 50 through crank arms 51, 52.

Figure 3:
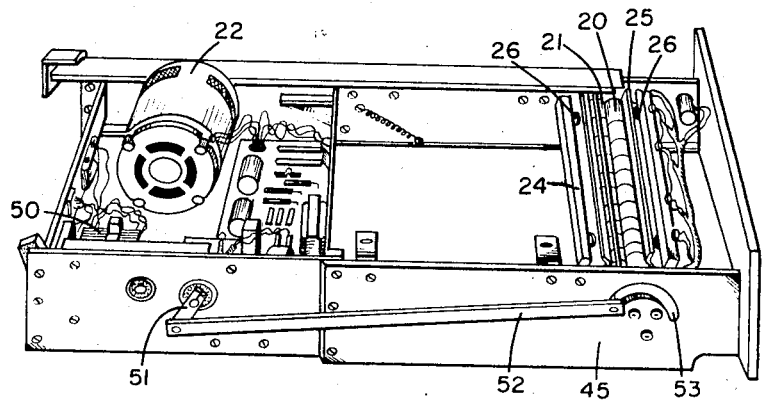
FIG. 3 is a similar view from the bottom side.
Figure 4:
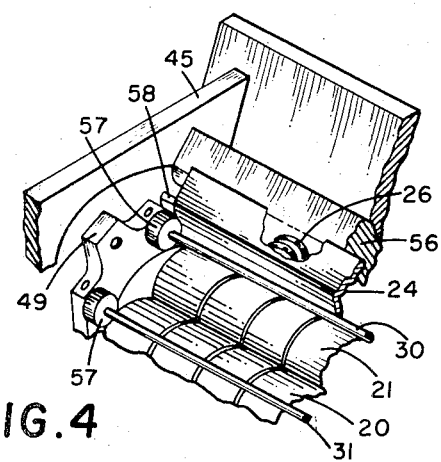
FIG. 4 is a fragmentary bottom view of a portion of the drive rolls and folding bars.
Figure 5:
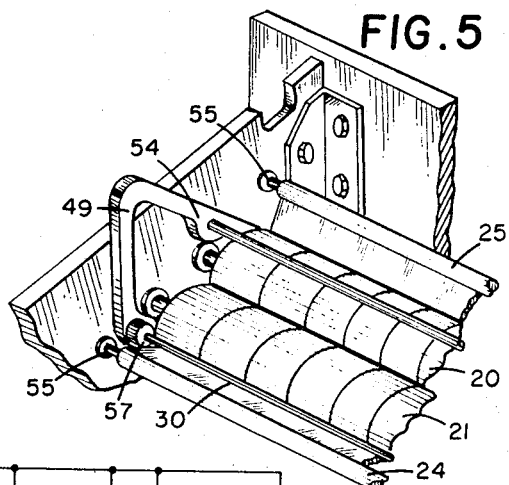
FIG. 5 is a fragmentary bottom view of the drive rolls and the mechanism for controlling the folding bars.

Clamps 24 and 25 are pivoted to the frame 45 as shown in FIG. 3 and FIG. 5, the pivot point at each end being identified by reference character 55, and as shown from underneath in FIG. 4 the clamp force spring 26 is mounted between the clamp 24 and a back brace 56 which is secured to frame 45.

At the location where each end of the carriage bars 30, 31 are secured to the frame 49 (FIGS. 4, 5) there is a roller 57 which, during the oscillation of the frame 49, engages a portion 58 of the clamps 24, 25 and pushes them away from the rollers 20, 21. At one point in the cycle both clamps are out of contact with the two rollers to allow the rollers to rotate and feed the paper between them.

Figure 6A:
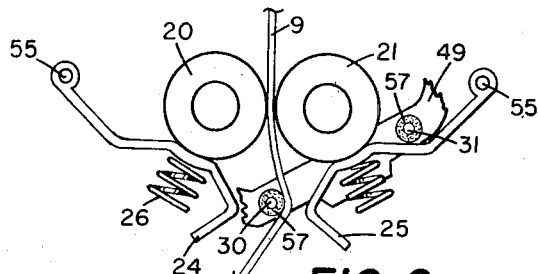
Figure 6B:
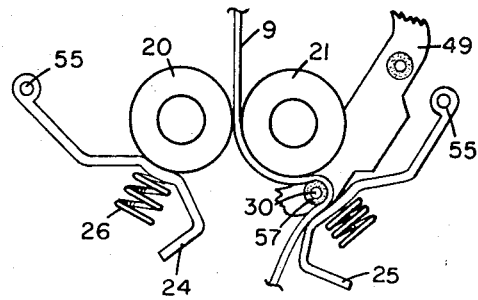
Figure 6C:
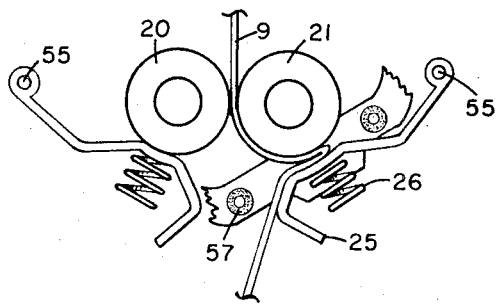
Figure 6D:
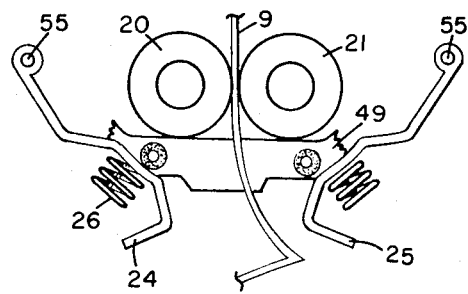
Figure 7A:
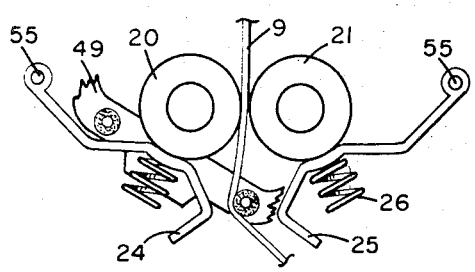
Figure 7B:
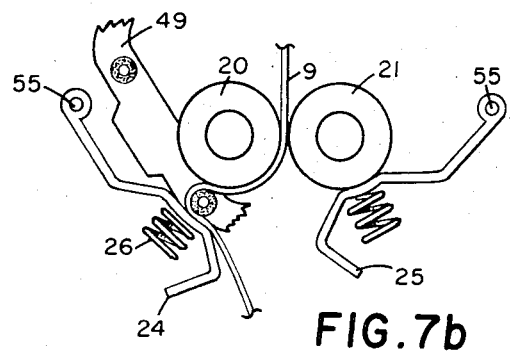
Figure 7C:
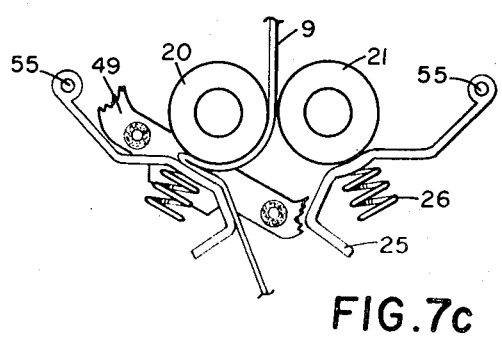
Figure 7D:
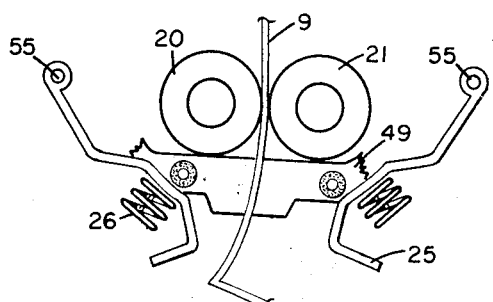

FIGS. 6a, b,c,d, show the sequence of a folding operation in one direction and FIGS. 7a, b, c, d, show the sequence in the opposite direction. FIG. 6a shows the paper 9 down between rolls 21, 20. At this instant the brake arm 44 has clamped disc 43 preventing rotation of rolls 20, 21. Frame 49 is being driven in the direction shown by the arrow causing carriage bar 30 to pick up the downstream portion of the paper chart and carry it to the location shown in FIG. 6b at which point the clamp bar 25 has been pushed away from roll 21 by roller 57 acting against a portion of the clamp bar 25. Then the frame 49 moves back to the left as shown in FIG. 6c leaving the loop of paper which is pre-scored at the location between the roll 20 and clamp 25, and as the roller 57 leaves the clamp 25 spring 26 pinches the paper at the pre-scored line against the roll 21. Continued movement of the frame 49 as shown in FIG. 6d and release of brake 43, 44 causes the folded paper to drop into a fan-folded pile as shown in FIG. 1. The back fold in the opposite direction is shown in FIGS. 7a, b, c, d, and is similar to the aforedescribed front fold operation.

The linear speed of the chart paper 9 may vary over a wide range, for example from 0.05 mm per second, to 200 mm per second, a 4,000:1 speed change, in a number of selected steps. However, once selected, the chart 9 at the location of the pen 12 moves at a constant rate of speed in order not to introduce errors in the recorded trace. The motor 22 which intermittently drives roll 21 must be capable of moving the chart 9 in excess of 200 mm per second in order to feed the chart paper 9 between rolls 20, 21 and to prevent pile-up of the chart between rolls 15, 16 and rolls 20, 21 due to the intermittent stop action while the paper is creased first by clamp 24 and then by clamp 25.

With reference to FIG. 8, there is shown a circuit whereby the photo-cell 37 energized by light from lamp 36 times and controls the operation of the folding motor 22 and the brake solenoid 47, in accordance with the passage of timing marks 35 between the light 36 and the cell 37.

Power is applied to terminals 60, one side of which is connected to the full wave bridge 61 comprising diodes 63, 64, 65, 66 and the other side of which is connected through switch 67 and folding motor 22 to the full wave bridge 61. Across the D.C. leg of bridge 61 are two capacitors 70, 71 and brake solenoid coil 47 which is in series with a silicon controlled rectifier 73. Across the rectifier 73 is double pole switch 74. Diodes 75 and 76 are for noise suppression.

Reduced voltage is applied across terminals 80, 81, and a current adjusting circuit 82 is connected to lamp bulb 36. A reference voltage from divider 83 is applied to comparator 85 at input 5, and the photo-cell output is applied to the comparator input 4, and the output from the comparator 85 is applied to transformer 86.

For each fold cycle the brake solenoid 47 must be briefly energized and the folding motor must be energized so that it completes exactly one-half revolution, after which the brake solenoid is released to cause the chart paper 9 to advance between driven rolls 20, 21. With switch 67 closed and when silicon controlled rectifier 73 is not conducting and switch 74 is open, capacitors 70, 71 are charged to line voltage. When a dark spot 35 interrupts the light beam to the photo-cell 37 a pulse is applied to the primary of transformer 86, resulting in a secondary pulse which turns on the silicon controlled rectifier 73 causing capacitors 70, 71 to discharge into solenoid 47. This applies the brake in less than about .002 second. At the same time current is flowing through bridge 61 to energize folding motor 22. A cam 88 on the motor 22 closes both blades of switch 74. The upper blade shorts out the silicon controlled rectifier 73 to cause it to return to its non-conducting state. When motor 22 completes its one-half revolution both blades of switch 74 open and motor 22 stops and releases brake solenoid 47. The capacitors recharge for the next cycle. The lower blade of switch 74 is used to bypass relay switch 67 which allows the cycle to be completed even though switch 67 is opened during the folding cycle. The photo-cell 37 changes resistance with a change in light intensity; the resistance increasing with a decrease in light intensity. The change in resistance causes a current change through the photo-cell 37 which is read as a voltage change across load resistor 89 which is fed into voltage comparator 85. Into the other input 90 is fed an adjustable reference voltage obtained from the adjustable circuit 83. When the voltage to comparator 85 at pin 4 is (+) with reference to the voltage at pin 5, the voltage at output pin 8 is (−). When the black mark 35 blocks off the light to photo-cell 37 the voltage at pin 4 becomes (−) in reference to the voltage at input 5, and this causes the output at 8 to change rapidly from (−) to (+), with a consequent pulse at the gate of silicon controlled rectifier 73, through transformer 86. As the black mark continues past the photo-transistor 37 and allows light to fall on it again, comparator input 4 becomes (+) relative to input 5, which flips the output at 8 from (+) back to (−). The pulse at the gate of silicon controlled rectifier 73 at this time is of the wrong polarity, and will not cause silicon controlled rectifier 73 to conduct and initiate a folding cycle.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What we claim is:

1. A folding machine for use with a long strip of paper which has been pre-scored at uniformly spaced locations and which includes timing marks in fixed relation to each of said pre-scored locations, comprising, in combination:

timing mark sensing means;
   means for advancing said strip of paper past a recording device and past said sensing means at a uniform rate of speed;
   drive roll means between which said strip moves after it passes said sensing means;
   means for momentarily stopping said drive roll means and said strip of paper at the location of said drive roll means, said means being connected to and timed by said timing mark sensing means;
   clamping means for clamping a pre-scored portion of said strip against one of said rolls as a backing device, means positioning a pre-scored portion of said strip between said clamping means and one of said rolls during the moment when said rolls are stopped, and means interconnecting said timing mark sensing means and said clamping means for operating said clamping means in timed relation to the positioning of a pre-scored portion of the strip between said clamping means and said roll.

2. A folding machine as set forth in claim 1, further characterized by two clamping means and two backing devices and by said positioning means locating a loop between one clamping means and an associated backing device to cause a fold, and thereafter positioning a loop between the other clamping means and its associated backing device.

3. A folding machine as set forth in claim 1, further characterized by drive rolls between which said strip is driven, said drive rolls comprising said means for stopping the advance of said paper strip.

4. A folding machine as set forth in claim 3, further characterized by motor means for driving at least one of said drive rolls, means to decouple said drive rolls from said motor while permitting the motor to continue to run, and means to couple the drive rolls to the motor after each said folding operation.

* * * * *